UNITED STATES PATENT OFFICE.

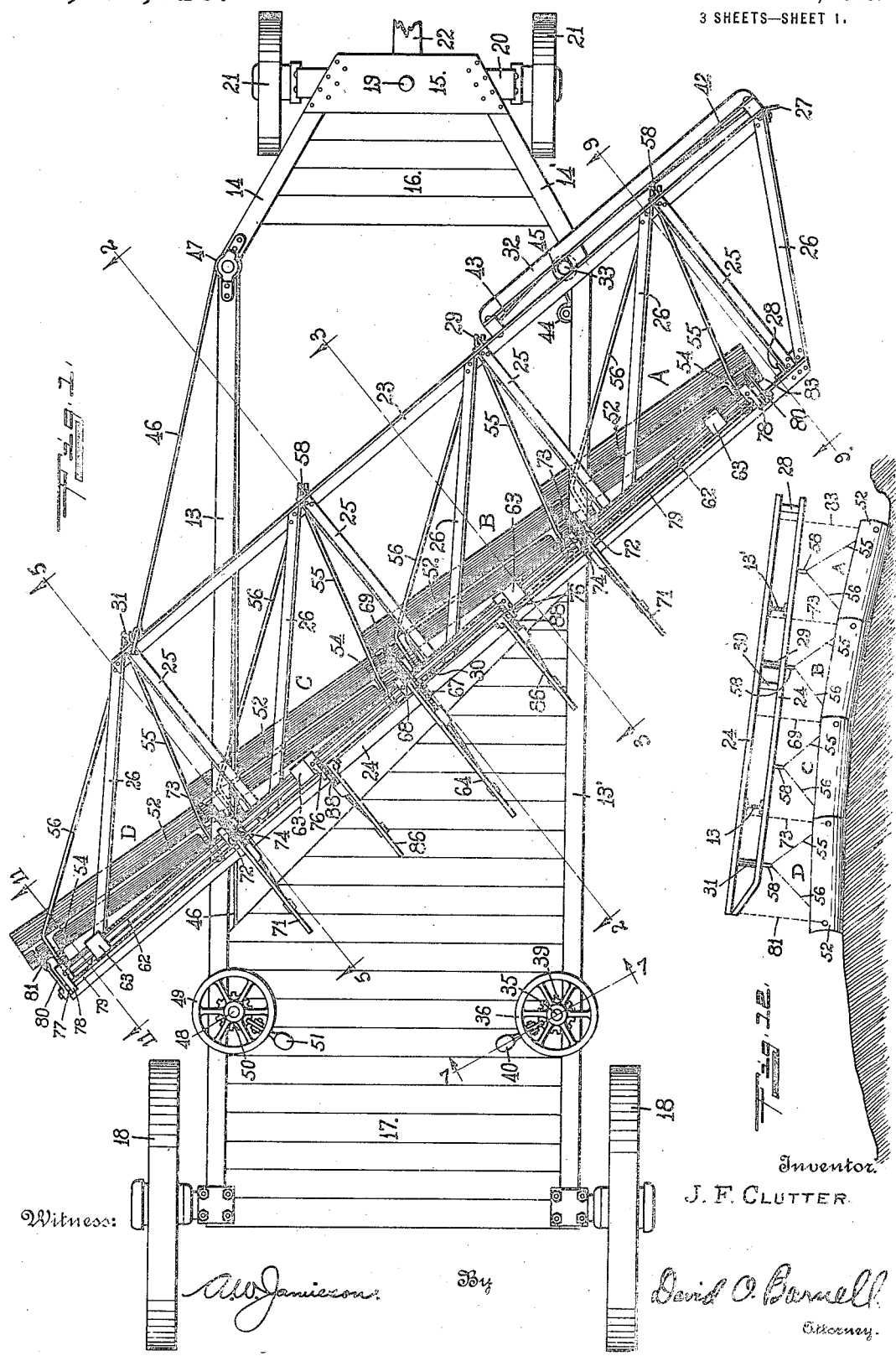

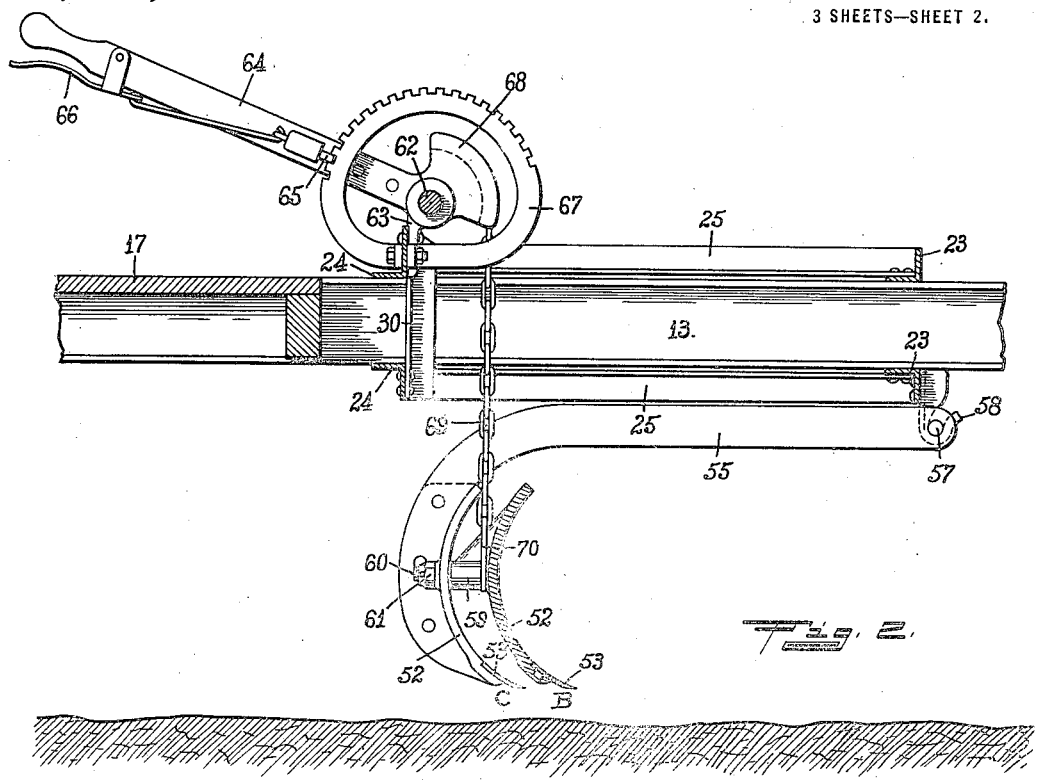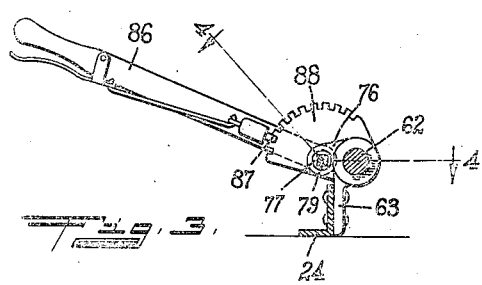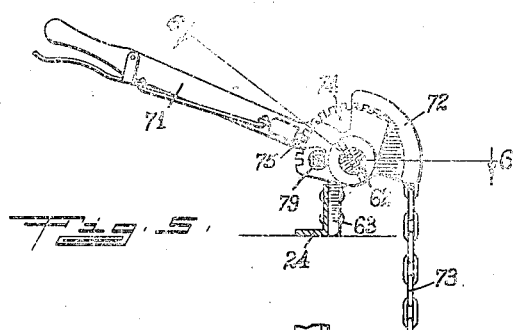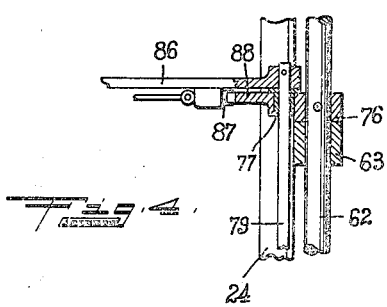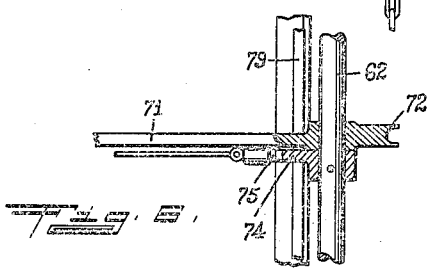

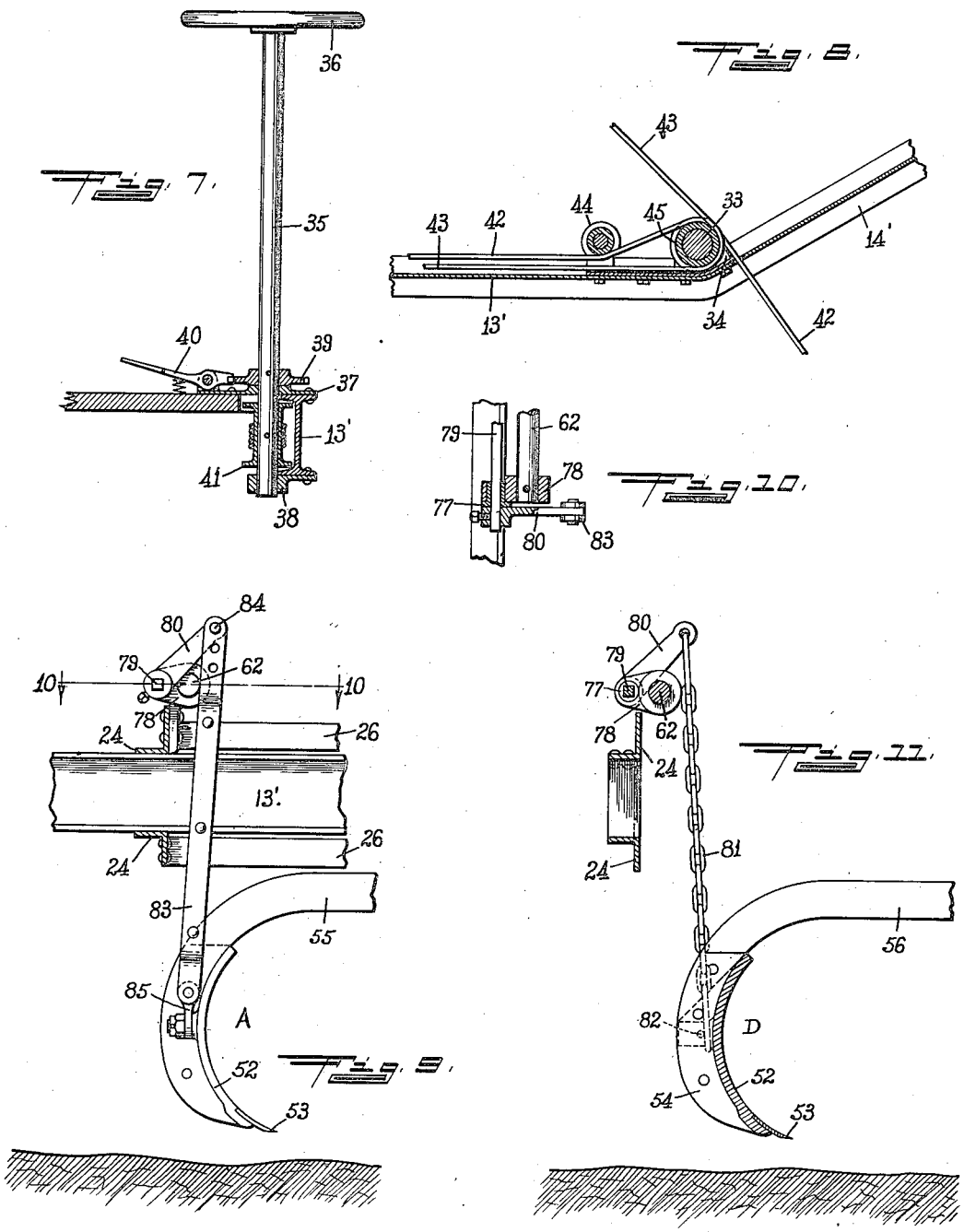

JOSEPH F. CLUTTER, OF OMAHA, NEBRASKA, ASSIGNOR OF ONE-HALF TO LEWIS E. ADAMS, OF OMAHA, NEBRASKA.

HIGHWAY-MAINTAINING MACHINE.

1,288,513.

Specification of Letters Patent.   Patented Dec. 24, 1918.

Application filed August 31, 1917.   Serial No. 189,096.

*To all whom it may concern:*

Be it known that I, JOSEPH F. CLUTTER, a citizen of the United States, and a resident of Omaha, in the county of Douglas and State of Nebraska, have invented certain new and useful Improvements in Highway-Maintaining Machines, of which the following is a specification.

My invention relates to machines for grading, smoothing and contouring roads or like earth surfaces, and the machine provided by my invention is especially designed to facilitate the maintenance of public roads and highways by smoothing the surface and shaping the transverse contour thereof. It is the object of my invention to provide in a machine of this kind a sectional scraper or earth-plane comprising an articulated series of blades or sections, and adjusting means therefor by which the contour of the surface formed thereby may be varied. A further object of my invention is to provide means for varying the height of the plane or scraper as a whole relatively to the supporting frame of the machine, without changing the contour-adjustment thereof. Further objects of my invention are to provide means for varying the angular relation of the scraper to the line of draft, and for varying the position of the scraper laterally of the supporting frame. Further objects of my invention relate to structural details of the controlling and draft devices, and will be fully set forth hereinafter.

In the accompanying drawings, Figure 1 is a plan view of a machine embodying my invention, Fig. 2 is a detail vertical sectional view thereof on the plane of the line 2—2 of Fig. 1, Fig. 3 is a detail vertical sectional view on the plane of the line 3—3 of Fig. 1, Fig. 4 is a detail section on the plane of the line 4—4 of Fig. 3, Fig. 5 is a detail vertical section on the plane of the line 5—5 of Fig. 1, Fig. 6 is a detail section on the plane of the line 6—6 of Fig. 5, Fig. 7 is a detail vertical section on the plane of the line 7—7 of Fig. 1, Fig. 8 is a detail horizontal section through a part of the side-shifting control devices, Fig. 9 is a detail vertical section on the plane of the line 9—9 of Fig. 1, Fig. 10 is a detail section on the plane of the line 10—10 of Fig. 9, Fig. 11 is a detail vertical section on the plane of the line 11—11 of Fig. 1, and Fig. 12 (Sheet 1) is a diagrammatic rear view of the articulated sectional scraper in operative position.

In carrying out my invention I provide a horizontal main frame having parallel longitudinal side-members 13 and 13', preferably formed from structural-steel I-beams, the forward portions 14 and 14' of said side-members extending convergently and being connected to each other by tie-plates 15, and suitable decks or platforms 16 and 17 being disposed, respectively, between the front and rear portions of the side-members. The rear end of the main frame is supported by a transversely extending axle which is fixedly connected with the frame and is provided at its ends with wheels 18. Beneath the tie-plates 15, and connected therewith by a king-bolt 19, there is a wheeled truck comprising an axle 20, wheels 21 and a suitable tongue 22 or similar draft appliance by which the vehicle may be drawn and guided.

On the intermediate portion of the main frame, between the front and rear decks 16 and 17, there is carried the floating frame comprising a vertically spaced pair of frame-sections passing above and below the main frame, each of said upper and lower frame-sections consisting principally of front and rear longitudinal beams 23 and 24 connected to each other by angularly disposed bars 25 and 26. The upper and lower sections of the floating frame are connected to each other by several vertically extending pieces 27, 28, 29, 30 and 31, and at one end the rear beam 24 of the lower section may bend upwardly to join the upper section, as indicated at the left of Fig. 12. At the front edge of the upper section of the floating frame, near the forward end thereof, a bar 32 is secured to the beam 23 in spaced parallel relation thereto, forming between said members a guide-slot through which a vertical pin 33 passes slidably, said pin being fixedly connected with the main frame by means of a bracket 34 secured to the latter at the juncture of the side-members 13' and 14'. The floating frame is movable pivotally about said pin 33, and is also slidable laterally of the main frame, the lateral movement being controlled as follows: At the side of the rear platform or deck 17 there is a vertical staff 35, carrying a hand-wheel 36 at its upper end, and revolubly mounted in bearing-plates 37 and 38 secured to the frame side-member 13' as shown in Fig. 7. A notched wheel 39 is secured to the staff above the plate 37, and a foot-latch 40 is pivoted on said plate and adapted to enter the notches of the wheel to prevent rotation of the staff. A drum 41 is secured to the staff between the bearing-plates 37 and 38, and to said drum is secured the central or intermediate portion of a cable which is wound several times about the drum, the end-portions 42 and 43 of the cable being extended forwardly from the drum alongside the frame-member 13'. The part 42 extends from the drum 41 to a small sheave 44 mounted on the bracket 34, thence passes around a sheave 45 mounted on the pin 33, thence extends laterally through an opening in the web of the frame-member 14' as shown in Fig. 8, and the end of said cable-part 42 is attached to the floating frame at the outer end of the guide-slot formed between the bar 32 and beam 23. The other cable-part 43 extends from the drum 41 directly to the sheave 45, passes around the same oppositely to the part 42, and the end of said cable-part 43 is connected with the floating frame at the inner end of the guide-slot. It will be seen that with the described arrangement, after releasing or disengaging the foot-latch from the wheel 39, the staff 35 may be rotated to pull the floating frame in either direction laterally of the main frame, and the parts retained in the adjusted position by permitting reëngagement of the foot-latch with the notched wheel 39.

For controlling the angular position of the floating frame, a cable 46 is attached thereto at the end opposite the pivot-pin 33, said cable extending forwardly to a sheave 47 mounted on the main frame at the juncture of the members 13 and 14, thence extending rearwardly along the inner side of the member 13, and the end of the cable being attached to a drum carried on a vertical staff 48 arranged at the side of the deck 17 opposite the staff 35. Said staff 48 is provided at its upper end with a hand-wheel 49, and carries a notched wheel 50 engageable by a foot-latch 51, the structure being substantially the same as that of the staff 35 and its accessories. By turning said staff 48 to wind the cable 46 upon the staff-drum, the rearward end of the floating frame is pulled forward relatively to the main frame, the floating frame moving pivotally about the pin 33, and thus changing the angular relation of the frames as may be desired, while the adjustment is maintained by engagement of the foot-latch 51 with the notched wheel 50.

In the illustrated structure the scraper or earth-plane comprises four sections A, B, C and D, each having a curved body-plate 52 with a cylindro-concave front surface and provided along its lower edge with a rectilinear facing-plate 53 terminating in a cutting-edge. The scraper-blades or sections, and the means for adjusting the same vertically, are carried on the floating frame so as to partake of the described lateral and angular adjustments of said frame. On the rearward side of each body-plate 52 there are two ribs 54 extending in vertical planes, and to said ribs are secured the downwardly curved rear end portions of draft-bars 55 and 56. Each pair of the draft-bars extends forward convergently to a transverse bolt or pin 57 by which the front ends of the bars are connected to each other, and said front ends of the draft-bars are pivotally connected to the floating frame by means of hooks 58 which extend between the bars and around the pins 57 as shown in Fig. 2. The hooks 58 for connection with the scraper-sections B and D are formed on the lower ends of the vertical pieces 29 and 31 used for connecting to each other the upper and lower portions of the floating frame, but the hooks for connection with the scraper-sections A and C are connected only to the beam 23 of the lower portion of the floating frame, since it is necessary, to enable lateral adjustments of the floating frame, that the parts thereof where the latter hooks are located be able to pass the side-members of the main frame. The draft-bars 56 are longer than the draft-bars 55, and when the floating frame is in a normal or intermediate angular relation to the main frame, as shown in Fig. 1, the draft-bars diverge equally from longitudinal planes parallel with the sides of the main frame, while the body-plates 52 lie in inclined or angular positions nearly parallel with the rear beams 24 of the floating frame. The rearward end of each of the scraper body-plates 52 extends in front of and slightly overlaps the adjoining forward end of the next plate of the series, and is pivotally connected therewith by the following means: On the back or convex side of each body-plate 52, near the rearward end thereof, there is a lug 59 from which a stud or pin 60 extends through an opening in the adjacent portion of the next body-plate, the latter being retained on the stud by means of a cottered nut 61, as shown in Fig. 2.

Slightly above and extending parallel with the upper rear beam 24 of the floating frame, there is a shaft 62 which is held revolubly in bearings 63 secured to said beam 24. At about the longitudinal center of said shaft a lever 64 is secured thereto, said lever carrying a latch 65 controlled by a grip-piece 66 and adapted to engage a notched segment 67. Said notched segment is secured to the upper beam 24 as shown in Fig. 2 and, when engaged by the latch 65, serves to hold the lever and shaft in adjusted relations to the frame. The lever 64 has formed integrally therewith a peripherally grooved sector 68 to which is connected one end of a chain 69, said chain extending downwardly from the sector and having at its lower end a link 70 fitting around the lug 59 of the pivotal connection between the scraper-sections B and C, as represented in Fig. 2. At positions intermediate the lever 64 and the ends of the shaft 62 there are pivotally mounted on said shaft levers 71 having grooved sectors 72 for connection with chains 73 which extend down therefrom and are connected at their lower ends with the lugs 59 at the juncture of the scraper-sections A—B and C—D, the connection being similar to that of the chain 69 above described. Adjoining each of the levers 71 there is secured to the shaft 62 a notched segment 74 which is engageable by a latch 75 on the respective lever to retain said lever in adjusted relations to the shaft. To the shaft 62, at positions intermediate the lever 64 and the levers 71, there are secured members 76 having sleeves 77 fitting revolubly in openings therein parallel with the shaft. At the ends of the shaft 62 there are secured crank-like members 78 which are also provided with openings for revoluble sleeves 77 alined axially with the corresponding sleeves in the members 76. The sleeves 77 have square axial apertures for receiving square rods 79 which project beyond the members 78 and carry at their outer ends cranks 80 which are connected with the outer ends of the scraper-sections A and D. At the end of the section D said connection with the crank 80 is formed by a chain 81 of which the lower end-link is passed over the lug 59 on the body-plate 52, being retained thereon by a cross-pin 82, as indicated in Fig. 11. At the end of the section A the connection to the crank 80 is formed by means of a two-part bar 83 of which the upper end straddles the crank and is pivotally connected therewith by a pin 84 passing through one of several transverse holes in the bar, while the lower end of said bar 83 is pivotally connected with the body-plate 52 by a shackle-link 85 secured to said body-plate as shown in Fig. 9. The intermediate portions of the square rods 79 pass loosely through openings in the segments 74, as shown in Fig. 5, and at the ends of said rods adjoining the members 76 there are secured levers 86 carrying latches 87 engageable with notched segments 88 which are concentric with the sleeves 77 and formed integrally with said members 76, as shown in Figs. 3 and 4. The latch-levers 86 serve to retain the end-cranks 80 in adjusted relations to the main shaft 62, while the rods 79 enable the location of said levers at positions where they will be accessible to the operator on the rear platform or deck 17 of the machine. The rods 79 also serve as torsion springs to enable slight movements of the cranks 80 which relieve and cushion the stresses on the parts caused during the use of the machine when the scraper-sections A and D strike objects tending to pull them downwardly, or to push the section A upwardly. The bar 83, being rigid, enables a downward pressure to be exerted upon the scraper-section A by the crank 80, such pressure sometimes being necessary on said section but not being required elsewhere along the scraper.

It will be obvious that, as each end of each section of the scraper is connected, mediately or immediately, to the shaft 62, the scraper or earth-plane may be raised or lowered relatively to the frame by turning said shaft 62 by means of the center-lever 64 and engaging the latch 65 with a suitable notch of the segment 67. The ends of the sectional plane or scraper, that is, the front end of the section A and the rear end of the section D, are raised and lowered relatively to the intermediate portions of the scraper by suitable manipulation of the levers 86. Similarly the adjoining ends of the sections C and D and of the sections A and B may be raised and lowered relatively to the remaining parts by manipulation of the levers 71. The central part of the scraper, at the juncture of the sections B and C, is raised or lowered only when the elevation of the scraper as a whole is changed relatively to the frame, but it will be seen that the connections to the levers 71 and 86 enable the contour of the cutting edge of the scraper to be changed as desired within the limits established by the structure of the adjusting connections. The use of the machine in forming a crowned or similarly-contoured road-surface will be clearly apparent from Fig. 12. The scraper-section A, being held down at its outer end by the bar 83, forms or enters and clears the ditch or gutter at the side of the roadway. Owing to the inclination of the scraper to the line of draft, the earth loosened thereby tends to be carried toward the center or crown of the road, and the lumps and pieces of the transferred material tend to be broken up by cascading at the offsets from one section of the scraper to the next. The scraper is ordinarily so adjusted that the concave front side thereof carries a quantity of the loose material which is available to fill up any depression of the road surface below the normal or desired contour thereof. All of the material carried by the scraper may be discharged at any time by moving the main control lever 64 to raise the cutting edges of the blades or sections above the surface of the ground. By shifting the floating frame laterally, the reach of the plane or scraper beyond either side of the machine may be increased or reduced as desired, and by the pivotal movement of the floating frame about the pin 33 the angle of the plane or scraper to the line of draft may be so adjusted as to secure the most efficient action of the machine under all conditions.

Now, having described my invention, what I claim and desire to secure by Letters Patent is:

1. In a machine of the class described, a substantially horizontal main frame, a secondary frame disposed on said main frame in substantially fixed vertical relation thereto and extending angularly beyond the sides thereof, means for varying the angular inclination of the secondary frame to the main frame, means for shifting said secondary frame laterally in the direction of its inclination to the main frame, a plurality of plane-blades carried by said secondary frame, and means mounted on said frame for severally controlling the elevation of said plane-blades.

2. In a machine of the class described, a substantially horizontal wheeled main frame, a secondary frame disposed on said main frame and extending angularly beyond the sides thereof, means for varying the angular inclination of said secondary frame to the main frame, means for moving the secondary frame relatively to the main frame in the direction of its inclination thereto, a plurality of plane-blades arranged in overlapping articulated series and extending approximately parallel with the rear portion of said secondary frame, draft-bars for said plane-blades pivotally connecting the same with the front portions of said secondary frame, a series of supporting members mounted on the rear portions of said secondary frame and connected with the ends and the several articulate junctures of the series of plane-blades, and means for adjusting said supporting members to raise or lower the attached plane-blades.

3. In a machine of the class described, a supporting frame, a series of plane-blades, draft-bars for said plane-blades pivotally connected with the frame, a shaft mounted on the frame, a series of supporting members carried by said shaft and connected with the several plane-blades, yieldable elements interposed in the connection between the shaft and some of said supporting members, and means for definitely varying the relation to the shaft of some of said supporting members.

4. In a machine of the class described, a supporting frame, a rocking shaft mounted thereon, means for rocking said shaft and retaining the same in adjusted positions relatively to the frame, a plurality of sectors carried by and having portions concentric with said shaft, means for independently moving some of said sectors about the axis of the shaft, torsion-bars carried by and extending parallel with the shaft, means connected with one end of each torsion-bar for rotating the same and retaining it in adjusted relations to the shaft, cranks carried at the opposite ends of said torsion-bars, plane-supporting members depending from the ends of said cranks and from the several sectors on the rocking-shaft, and a series of plane-blades supported by said depending members.

5. In a machine of the class described, a supporting frame, a rocking shaft mounted thereon, a centrally disposed actuating lever for said shaft, means for holding the same in adjusted relations to the frame, intermediate control-levers pivoted on the shaft, means for holding said levers in adjusted relations to the shaft, torsion-rods revolubly connected with the shaft and extending from the ends toward the intermediate portions thereof, levers connected with the inner ends of said torsion-rods, means for holding said levers in adjusted relations to the shaft, cranks carried at the outer ends of said torsion-rods, depending members carried by said cranks, depending members carried by the intermediate control-levers, a central depending member carried directly by the rocking-shaft, and a series of plane-blades carried by said depending members in subjacent relation to the frame.

6. In a machine of the class described, a supporting frame, a rocking shaft mounted thereon, a main control-lever secured to said shaft, means for retaining the same in adjusted relations to the frame, torsion-rods revolubly connected with the shaft and extending from the ends toward the intermediate portions thereof, control-levers connected with the adjacent ends of said torsion-rods, means for holding said levers in adjusted relations to the shaft, cranks carried at the remote ends of said torsion-rods, depending members carried by said cranks, laterally extending elements carried on the shaft intermediate the ends thereof, depending members carried by said laterally extending elements, and a series of plane-blades carried by said depending members in subjacent relation to the frame.

7. In a machine of the class described, a main supporting frame, an earth-plane comprising a plurality of blades having rectilinear cutting edges and serially overlapped pivotally connected end portions, separate draft devices for said blades, supporting means connected with the plane near the ends of the several blades, said means being independently variable to change the contour of the cutting edge of the plane as a whole, a supplementary frame carried on the main frame and connected with the plane by said draft devices and said variable supporting means, and means for varying the angular relation of said supplementary frame to the main frame.

8. In a machine of the class described, in combination, a wheeled main frame, a floating frame carried on said main frame, means for varying the position of the floating frame laterally of the main frame, means for varying the angular relation of the floating frame to the main frame, a plurality of plane-blades, draft-bars for each of said blades pivotally connected with the floating frame, means pivotally connecting to each other adjoining ends of said plane-blades to form a flexible plane comprising an articulated series of said blades, supporting devices carried by the floating frame and connected with the several plane-blades, said devices being independently adjustable to vary the elevation of the several longitudinal parts of the flexible plane, and means for varying the elevation of the plane as a whole without altering the adjustment of said supporting devices.

J. F. CLUTTER.